United States Patent [19]

Kato

[11] 4,449,150
[45] May 15, 1984

[54] METHOD OF PROCESSING MEDIUM TONE PICTURE

[75] Inventor: Tomokazu Kato, Tokyo, Japan

[73] Assignee: Ricoh Company, Ltd., Tokyo, Japan

[21] Appl. No.: 335,417

[22] Filed: Dec. 29, 1981

[30] Foreign Application Priority Data

Jan. 19, 1981 [JP] Japan .................................... 56-6151
Jan. 29, 1981 [JP] Japan .................................. 56-12166

[51] Int. Cl.³ .............................................. H04N 1/40
[52] U.S. Cl. .................................... 358/283; 358/260
[58] Field of Search ................ 358/133, 138, 260, 263, 358/280, 283

[56] References Cited

U.S. PATENT DOCUMENTS

| | | | |
|---|---|---|---|
| 4,032,978 | 6/1977 | Wong .................................... | 358/283 |
| 4,196,452 | 4/1980 | Warren et al. ........................ | 358/283 |
| 4,196,453 | 4/1980 | Warren ................................. | 358/283 |
| 4,245,258 | 1/1981 | Holladay ............................. | 358/280 |

*Primary Examiner*—Joseph A. Orsino, Jr.
*Attorney, Agent, or Firm*—David G. Alexander

[57] ABSTRACT

Of a plurality of threshold matrices, one is selected at random for each predetermined number of picture elements of a medium tone picture which is the same as the number of threshold components of the matrix, or at a random time interval. The density levels of the respective picture elements are compared with the corresponding threshold components which constitute the selected matrix, whereby the density level of each output picture element is determined to be black level or white level.

The density level of each picture element of a medium tone picture is compared with a threshold value which is a random number generated by a random number generator, thereby determining the density level of an output picture element to be black level or white level. The difference or error in density level between a selected picture element or picture element in question to be compared with a random number and its output picture element is calculated. The resultant error is distributed and added to the density levels of other picture elements which neighbor the picture element in question and are to be processed subsequently, in accordance with specific distribution coefficients. This compensates the density level of each neighboring picture element and thereby avoids excessive dispersion of high frequency components in output pictures, which is critical to high quality picture reproduction.

19 Claims, 5 Drawing Figures

METHOD OF PROCESSING MEDIUM TONE PICTURE

BACKGROUND OF THE INVENTION

The present invention relates to a method of processing pictures of medium or half tone to reproduce them in black and white picture elements.

A typical method for the reproduction of medium tone pictures in black and white picture elements is the dither method. In this method, the density level S(i,j) of each picture element (i,j) constituting a medium tone picture is compared with a corresponding threshold component $T_D(k,l)$ of a threshold matrix (dither matrix) $T_D$ which has $M \times N$ threshold components. If the density level S(i,j) is larger than or equal to the threshold component $T_D(k,l)$, the picture element will have a logical "1" or black density level when reproduced; if not, a logical "0" or white density level.

Conversion of the picture element (k,j) and threshold component (k,l) is generally carried out according to equations:

$$k = \text{Mod}(i, M) \qquad \text{Eq. (1)}$$

(if $k = 0$, $k = M$)

$$l = \text{Mod}(j, N) \qquad \text{Eq. (2)}$$

(if $l = 0$, $l = N$)

where Mod(x,y) is a function indicating a residual of division of x by y.

The dither method provides output pictures of a significant quality if input pictures are ture medium tone images. However, the repetitive use of the same threshold component at a predetermined period produces moiré fringes should input pictures be dot pictures or dither pictures.

An implement heretofore known to eliminate such moiré fringes consists in generating a random number for each picture element to designate a specific threshold component of a threshold matrix. Though succeeding in the elimination of moiré fringes, such an implement has a drawback that, since a threshold component is designated by generating a random number for each picture element, the distance between picture elements where the same threshold component is designated is irregular resulting in noticeable noise in output images. Another drawback inherent in this known implement is that the generation of a random number for each picture element requires a high speed random number generator, which increases the cost of the entire apparatus. Stated another way, the total processing rate is dependent on the operation rate of the random number generator.

SUMMARY OF THE INVENTION

A method of processing a medium tone picture constituted by a plurality of elements embodying the present invention comprises the steps of (a) scanning the medium tone picture and detecting the density levels of the picture elements, (b) providing a plurality of threshold matrices, each matrix having a predetermined number of threshold components, (c) dividing the picture elements into a plurality of groups, each group having the same number of picture elements as the threshold components of each matrix, (d) selecting one of the matrices at random and comparing the threshold components of the selected matrix with the corresponding picture elements of one of the groups of picture elements respectively, and (e) determining the density level of each of the picture element to be a black density level when the density level of the picture element is higher than that of the corresponding threshold component and to be a white density level when the density level of the picture element is lower than that of the corresponding threshold component.

Another method of processing a medium tone picture constituted by a plurality of picture elements embodying the present invention comprises the steps of (a) scanning the medium tone picture and detecting the density levels of the picture elements, (b) providing a plurality of random numbers and selecting one of the random numbers at random, (c) selecting a given picture element, (d) comparing the density level of the given picture element with the selected one of the random numbers, (e) determining the density level of the given picture element to be a black density level when the density level of the given picture element is higher than that of the selected one of the random numbers and to be a white density level when the density level of the given picture element is lower than that of the selected one of the random numbers, (f) picking out a predetermined plurality of picture elements adjacent to the given picture elements, (g) calculating a difference between the density level of the given picture element after the density level of the given picture element is compared with the selected one of the random numbers and the density level of the given picture element before the density level of the given picture element is compared with the selected one of the random numbers, (h) providing the same number of coefficients as the adjacent picture elements picked out, (i) multiplying the difference by the respective coefficients to provide a corresponding number of errors, (j) additionally selecting one of the random numbers at random, (k) adding each of the errors to the density level of the corresponding adjacent picture element (l) comparing the sum of each of the errors and the density of each of the adjacent picture elements with the additionally selected one of the random numbers, and (m) determining the density level of each of the adjacent picture elements to be a black density level when the sum is greater than the additionally selected one of the random numbers and to be white density level when the sum is smaller than the additionally selected one of the random numbers.

In accordance with an aspect of the present invention, of a plurality of threshold matrices, one is selected at random for each predetermined number of picture elements of a medium tone picture which is the same as the number of threshold components of the matrix, or at random time interval. The density levels of the respective picture elements are compared with the corresponding threshold components which constitute the selected matrix, whereby the density level of each output picture element is determined to be black level or white level.

In accordance with another aspect of the present invention, the density level of each picture element of a medium tone picture is compared with a threshold value which is a random number generated by a random number generator, thereby determining the density level of an output picture element to be black level or white level. The difference or error in density level between a selected picture element or picture element in question to be compared with a random number and its output picture element is calculated. The resultant error is distributed and added to the density levels of other picture elements which neighbor the picture element in question and are to be processed subsequently, in accordance with specific distribution coefficients. This compensates the density level of each neighboring picture element and thereby avoids excessive dispersion of high frequency components in output pictures, which is critical to high quality picture reproduction.

It is an object of the present invention to provide a medium tone picture processing method which can reproduce quality pictures free from moiré fringes or noise using a random number generator whose operation rate is not so high as that required for the prior art method.

It is another object of the present invention to provide a generally improved method of processing medium tone pictures.

Other objects, together with the foregoing, are attained in the embodiments described in the following description and illustrated in the accompanying drawings.

DESCRIPTION OF THE PREFERRED EMBODIMENTS

While the medium tone picture processing method of the present invention is susceptible of numerous physical embodiments, depending upon the environment and requirements of use, substantial numbers of the herein shown and described embodiments have been made, tested and used, and all have performed in an eminently satisfactory manner.

Figure 1:
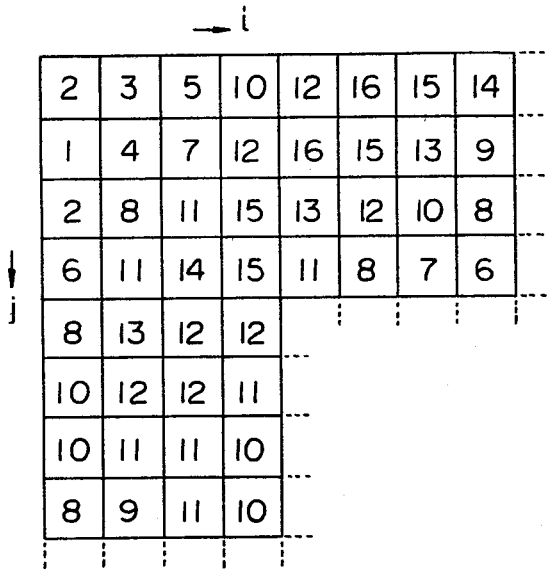
FIG. 1 shows an example of medium tone pictures which is processed by a method embodying the present invention.
Figure 2:
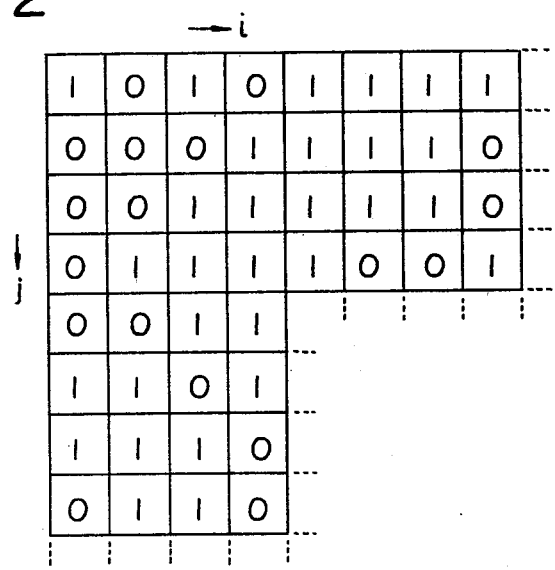
FIG. 2 shows an output picture obtained from the exemplary medium tone picture of FIG. 1.
Figure 3:
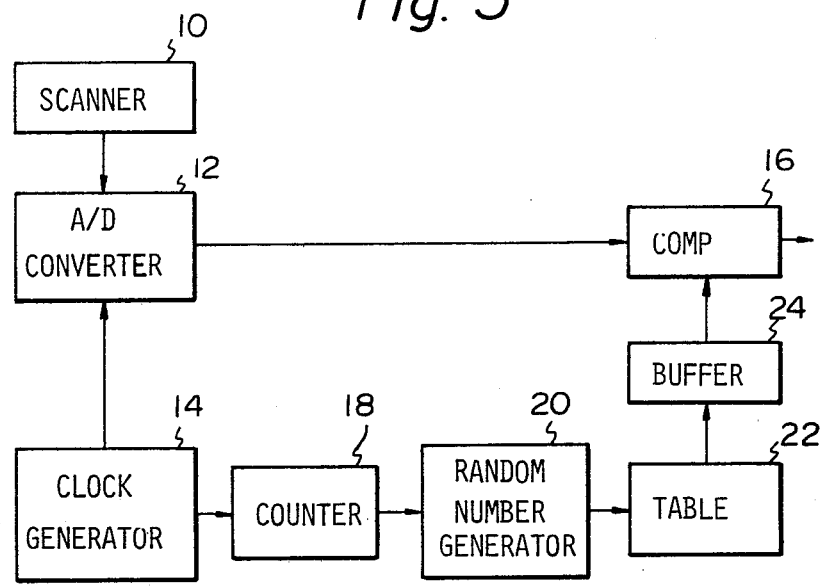
FIG. 3 is a block diagram showing an apparatus for practicing the method represented by FIGS. 1 and 2.

Reference will now be made to FIGS. 1-3 for describing a first embodiment of the present invention.

Suppose that seventeen density levels, i.e. density levels 0-16, are employed for processing medium tone pictures. Then, four different threshold matrices $T_p$ (P=1-4) each having 4×4 (=M×N) threshold components are prepared as shown below. It will be seen that the pattern of threshold components in each matrix is different from the pattern of threshold components in each other matrix.

$$T_1 = \begin{bmatrix} 1 & 9 & 3 & 11 \\ 13 & 5 & 15 & 7 \\ 4 & 12 & 2 & 10 \\ 16 & 8 & 14 & 6 \end{bmatrix} \quad T_2 = \begin{bmatrix} 9 & 15 & 1 & 7 \\ 8 & 10 & 16 & 2 \\ 3 & 5 & 11 & 13 \\ 14 & 4 & 6 & 12 \end{bmatrix}$$

$$T_3 = \begin{bmatrix} 9 & 1 & 15 & 7 \\ 14 & 6 & 4 & 12 \\ 3 & 11 & 5 & 13 \\ 8 & 16 & 10 & 2 \end{bmatrix} \quad T_4 = \begin{bmatrix} 1 & 11 & 3 & 9 \\ 16 & 6 & 14 & 8 \\ 4 & 10 & 2 & 12 \\ 13 & 7 & 15 & 5 \end{bmatrix}$$

While a better result is achievable as the number of threshold matrices increases, four matrices will suffice in practice.

Where such threshold matrices $T_P$ are used to process a medium tone picture having the density level distribution shown in FIG. 1 by way of example, the picture elements are divided into groups each consisting of 4×4 picture elements. Of the four threshold matrices, one is selected at random for each picture element group. For such random selection of a threshold matrix, an arrangement may be made such that, every time the picture element group to be processed shifts from one to another, a random number P (=1-4) is generated to pick up specific one $T_P$ of the four threshold matrices $T_1$-$T_4$ stored in a table which corresponds to the random number P.

For each picture element of a medium tone picture, its output picture element has a density level which is determined by applying a selected threshold matrix to a picture element group to which the picture element belongs, in a manner similar to the conventional dither method. The density level S(i,j) of a picture element (i,j) of a medium tone picture is compared with a corresponding threshold component $T_P(k,l)$ of a threshold matrix $T_P$ which has been selected for a group to which the picture element (i,j) concerned belongs. If the density level S(i,j) is larger than or equal to the threshold component $T_P(k,l)$, the density level O(i,j) of an output picture element will be logical "1" or black; if not, logical "0" or white. Conversion of the picture element (i,j) and threshold component (k,l) are carried out according to Equations (1) and (2).

An output picture provided by processing the picture of FIG. 1 is illustrated in FIG. 2. This indicates an exemplary case wherein the threshold matrix $T_1$ is applied to a group having picture elements (0, 0)-(3, 3), the threshold matrix $T_3$ to a group having picture elements (4, 0)-(7, 3), and the threshold matrix $T_2$ to a group having picture elements (0, 4)-(3, 7).

Referring to FIG. 3, an apparatus applicable for practicing the method of FIGS. 1 and 2 includes an analog-to-digital converter 12 to which an analog density signal is coupled from a scanner 10. The analog-to-digital converter 12 processes the analog density signal with respect to seventeen values (density levels 0-16) for each picture element in synchronism with clock pulses coupled thereto from a clock pulse generator 14. The output signal of the analog-to-digital converter 12 is supplied to a comparator circuit 16. A counter 18 triggers a random number generator 20 to generate a random number every time the medium tone picture is scanned through its four picture elements horizontally and vertically. A table 22 stores therein four threshold matrices $T_P$ (P=1-4). In response to the random number P, a threshold matrix $T_P$ on the designated co-ordinates is read from the table 22 and registered in a buffer memory 24.

The comparator 16 is supplied with the picture element density signal from the comparator 16 and a corresponding threshold component of the matrix $T_P$ from the buffer memory 24. The comparator 16 compares the two inputs in the previously described manner and its output is delivered as a density signal of an output picture element.

It will be seen that the method of the invention described hereinabove selects a plurality of threshold matrices one at a time in a random fashion and thereby eliminates moiré fringes, which would result from periodical use of the same threshold value. Additionally, since the method is not of the type which designates a threshold component of a threshold matrix at random for each picture element, not only the noise is made insignificant but the random number generator needs only a moderate operation rate or speed.

Figure 4:
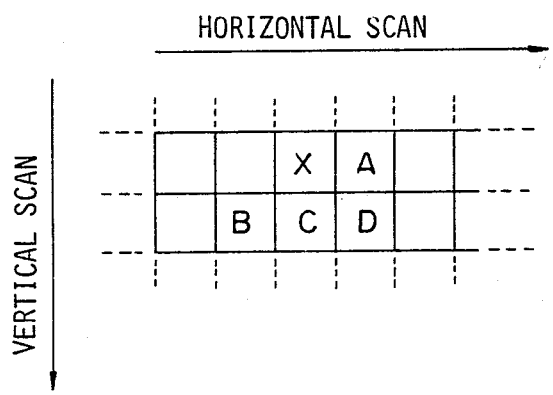
FIG. 4 shows a group of picture elements of a picture which is processed by another embodiment of the present invention.
Figure 5:
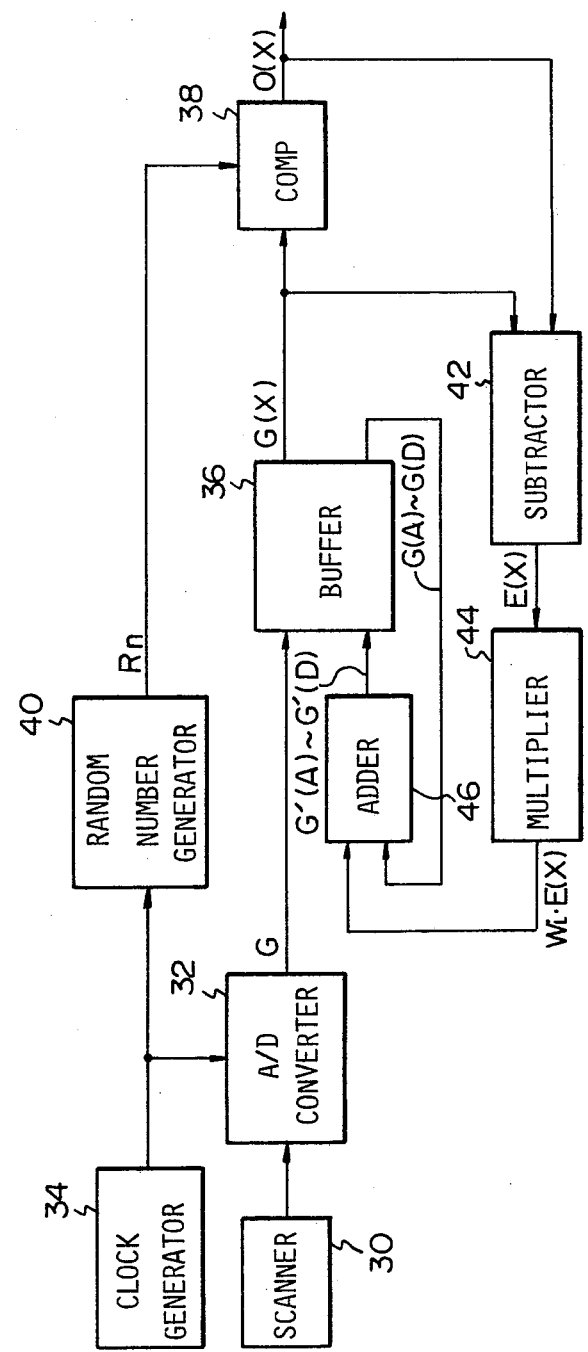
FIG. 5 is a block diagram showing an apparatus practicing the method represented by FIG. 4.

A second embodiment of the present invention is illustrated in FIGS. 4 and 5. In FIG. 4, suppose that a picture element X is a picture element which is to be compared with a random number. The density level $G(X)$ of the picture element X in question is compared with a random number $Rn$. If the density level $G(X)$ is larger than or equal to the random number $Rn$, the output picture element will have a density level $O(X)$ which is logical "1" or black; if not, a density level $O(X)$ which is logical "0" or white. It should be noted, however, that the relationship between the logical "1" and "0" levels may be inverted.

The density level $O(X)$ of the output picture element is subtracted from the density level $G(X)$ of the picture element in question to provide a difference (error) $E(X)$, i.e. $E(X)=G(X)-O(X)$. When $O(X)$ is "1", $E(X)$ is $G(X)-1$ and, when $O(X)$ is "0", $E(X)$ is equal to $G(X)$.

The error $E(X)$ is multiplied by specific distribution coefficients $W_1$, $W_2$, $W_3$ and $W_4$ for a plurality of picture elements A, B, C and D which neighbor the picture element X in question and will undergo the process subsequently. The resultant distribution errors $W_1 E(X)$, $W_2 E(X)$, $W_3 E(X)$ and $W_4 E(X)$ are added to the density levels $G(A)$, $G(B)$, $G(C)$ and $G(D)$ of the picture elements A, B, C and D, respectively. Thus, the picture elements A, B, C and D after the addition of the error $E(X)$ to their density levels will have density levels $G'(A)$, $G'(B)$, $G'(C)$ and $G'(D)$:

$$G'(A)=G(A)+W_1 E(X)$$

$$G'(B)=G(B)+W_2 E(X)$$

$$G'(C)=G(C)+W_3 E(X)$$

$$G'(D)=G(D)+W_4 E(X)$$

It will be noted that picture elements on a horizontal scan line are processed horizontally in sequence.

Experiments showed that, where the input density levels of picture elements of a medium tone picture are regularized to lie in the range of 0–1, an output picture of a high quality is achievable if the sum T of all the distribution coefficients $W_1$, $W_2$, $W_3$ and $W_4$ is in the range of $1.0<T<2.5$. For example, the distribution coefficients $W_1$, $W_2$, $W_3$ and $W_4$ may be selected to be 0.6, 0.4, 0.6 and 0.4, respectively, so that the sum T is 2.0. Alternatively, the distribution coefficients $W_1$, $W_2$, $W_3$ and $W_4$ may be 0.7, 0.4, 0.7 and 0.4, respectively, to provide a sum T which is 2.2.

As the distribution or addition of the error $E(X)$ is repeated, it may occur that the density level $G'$ of each picture element (A-D for instance) overflows or underflows. For example, where the range of density levels $G'$ is selected to lie in the range of $0 \geq G' \geq 2$, the density level may underflow as $-0.5$ or overflow as 2.5. In such a case, the fraction outside the preselected range will be omitted so that $-0.5$ becomes 0 and 2.5 becomes 2.

The method according to the second embodiment is practicable with an apparatus illustrated in FIG. 5. In FIG. 5, an analog density signal of a medium tone picture is fed from a scanner 30 to an analog-to-digital converter 32 and thereby quantitized in response to clock pulses supplied by a clock pulse generator 34. The output of the analog-to-digital converter 32 is stored in a buffer memory 36. In this embodiment, the buffer memory 36 stores two scan lines of picture element density data.

The density of a picture element in question (X in FIG. 4) is fed from the buffer memory 36 to a comparator 38. Also fed to the comparator 38 is a random number which is produced from a random number generator 40 in response to a clock pulse. The comparator 38 compares the density of the picture element in question with the random number (threshold value) and, if the former is larger than the latter, produces a logical "1" or black signal while producing a logical "0" or white signal if otherwise. The level of this output signal of the comparator 38 is the density level $O(X)$ of an output picture element corresponding to the picture element X.

A subtractor 42 subtracts the density level $O(X)$ of the output picture element from the density level $G(X)$ of the picture element in question and supplies the resultant error $E(X)$ to a multiplier 44. The multiplier 44 calculates distribution errors $W_i E(X)$ for the respective picture elements (A-D in FIG. 4) which neighbor the picture element X. An adder 46 adds a distribution error $W_i E(X)$ supplied from the multiplier 44 to the densities $G(A)-G(D)$ of the corresponding picture elements stored in the buffer memory 36. Based on these sums $G'(A)-G'(D)$, corresponding data in the buffer memory 36 are renewed.

It will be noted that the number and positions of picture elements to which the error is distributed are not limited to those described hereinabove. Also, the apparatus shown in FIG. 5 is not limitative but only illustrative.

It will be seen from the above that the second embodiment of the present invention can reproduce quality pictures free from moiré fringes even from medium tone pictures having periodic patterns such as dot images.

Various modifications will become possible for those skilled in the art after receiving the teachings of the present disclosure without departing from the scope thereof.

What is claimed is:

1. A method of processing a medium tone picture constituted by a plurality of picture elements comprising the steps of:
    (a) scanning the medium tone picture and detecting the density levels of the picture elements;
    (b) providing a plurality of threshold matrices, each matrix having a predetermined number of threshold components arranged in a pattern which is different from each other matrix;
    (c) dividing the picture elements into a plurality of groups, each group having the same number of picture elements as the threshold components of each matrix;
    (d) selecting one of the matrices at random and comparing the threshold components of the selected one of the matrices with the corresponding picture elements of one of the groups of picture elements respectively; and
    (e) determining the density level of each of the picture element to be a black density level when the density level of the picture element is higher than that of the corresponding threshold component and to be a white density level when the density level of the picture element is lower than that of the corresponding threshold component.

2. A method as claimed in claim 1, in which step (a) comprises step (f) of detecting analog density levels of the picture elements of the scanned medium tone picture.

3. A method as claimed in claim 2, in which step (a) further comprises step (g) of converting the analog density levels into digital density levels respectively.

4. A method as claimed in claim 3, in which the converted digital density levels comprise 17 levels.

5. A method as claimed in claim 1, in which step (b) provides four threshold matrices.

6. A method as claimed in claim 5, in which said four matrices are as follows:

$$T_1 = \begin{bmatrix} 1 & 9 & 3 & 11 \\ 13 & 5 & 15 & 7 \\ 4 & 12 & 2 & 10 \\ 16 & 8 & 14 & 6 \end{bmatrix} \quad T_2 = \begin{bmatrix} 9 & 15 & 1 & 7 \\ 8 & 10 & 16 & 2 \\ 3 & 5 & 11 & 13 \\ 14 & 4 & 6 & 12 \end{bmatrix}$$

$$T_3 = \begin{bmatrix} 9 & 1 & 15 & 7 \\ 14 & 6 & 4 & 12 \\ 3 & 11 & 5 & 13 \\ 8 & 16 & 10 & 2 \end{bmatrix} \quad T_4 = \begin{bmatrix} 1 & 11 & 3 & 9 \\ 16 & 6 & 14 & 8 \\ 4 & 10 & 2 & 12 \\ 13 & 7 & 15 & 5 \end{bmatrix}$$

where $T_1$, $T_2$, $T_3$ and $T_4$ designate the respective matrices.

7. A method as claimed in claim 1, further comprising step (f) of storing the threshold matrices provided in step (b).

8. A method as claimed in claim 1, in which step (d) comprises step (f) of providing the same number of random numbers as the threshold matrices provided in step (b).

9. A method as claimed in claim 8, in which step (d) further comprises step (g) of selecting at random one of the random numbers provided in step (f).

10. A method as claimed in claim 9, in which step (d) further comprises step (h) of selecting one of the matrices corresponding to said one of the random numbers selected in step (g).

11. A method as claimed in claim 10, in which step (d) further comprises step (i) of storing said one of the matrices selected in step (h).

12. A method of processing a medium tone picture constituted by a plurality of picture elements comprising the steps of:
(a) scanning the medium tone picture and detecting the density levels of the picture elements;
(b) providing a plurality of random numbers and selecting one of the random numbers at random;
(c) selecting a given picture element;
(d) comparing the density level of the given picture element with the selected one of the random numbers;
(e) determining the density level of the given picture element to be a black density level when the density level of the given picture element is higher than that of the selected one of the random numbers and to be a white density level when the density level of the given picture element is lower than that of the selected one of the random numbers;
(f) picking out a predetermined plurality of picture elements adjacent to the given picture element;
(g) calculating a difference between the density level of the given picture element after the density level of the given picture element is compared with the selected one of the random numbers and the density level of the given picture element before the density level of the given picture element is compared with the selected one of the random numbers;
(h) providing the same number of coefficients as the adjacent picture elements picked out;
(i) multiplying the difference by the respective coefficients to provide a corresponding number of errors;
(j) additionally selecting one of the random numbers at random;
(k) adding each of the errors to the density level of the corresponding adjacent picture element;
(l) comparing the sum of each of the errors and the density level of each of the adjacent picture elements with the additionally selected one of the random numbers; and
(m) determining the density level of each of the adjacent picture elements to be a black density level when the sum is greater than the additionally selected one of the random numbers and to be a white density level when the sum is smaller than the additionally selected one of the random numbers.

13. A method as claimed in claim 12, in which step (a) comprises step (n) of detecting analog density levels of the picture elements of the scanned medium tone picture.

14. A method as claimed in claim 13, in which step (a) further comprises step (o) of converting the analog density levels into digital density levels respectively.

15. A method as claimed in claim 14, in which step (a) further comprises step (p) of storing the converted digital density levels.

16. A method as claimed in claim 14, in which when the converted digital density levels are selected to be numerical values 0 to 1 and four coefficients are provided, the sum of the four coefficients lies between 1.0 and 2.5.

17. A method as claimed in claim 16, in which when the sum of the coefficients is 2.0, the coefficients are selected to be numerical values 0.6, 0.4, 0.6 and 0.4 respectively.

18. A method as claimed in claim 16, in which when the sum of the coefficients is 2.2, the coefficients are selected to be numerical values 0.7, 0.4, 0.7 and 0.4 respectively.

19. A method of processing a medium tone picture constituted by a plurality of picture elements comprising the steps of:
(a) scanning the medium tone picture and detecting the density levels of the picture elements;
(b) providing a plurality of threshold matrices, each matrix having a predetermined number of threshold components arranged in a pattern which is different from each other matrix;
(c) dividing the picture elements into a plurality of groups, each group having the same number of picture elements, as the threshold components of each matrix;
(d) selecting one of the matrices at random and comparing the threshold components of the selected one of the matrices with the corresponding picture elements of one of the groups of picture elements respectively; and (e) determining the density level of each of the picture element to be a black density level when the density level of the picture element is higher than that of the corresponding threshold component and to be a white density level when the density level of the picture element is lower than that of the corresponding threshold component;

step (a) further comprising step (f) of detecting analog density levels of the picture elements of the scanned medium tone picture;

step (a) further comprising step (g) of converting the analog density levels into digital density levels respectively;

the method further comprising step (h) of storing the threshold matrices provided in step (b);

step (d) further comprising step (i) of providing the same number of random numbers as the threshold matrices provided in step (b);

step (d) further comprising step (j) of selecting at random one of the random numbers provided in step (i);

step (d) further comprising step (k) of selecting one of the matrices corresponding to said one of the random numbers selected in step (j);

step (d) yet further comprising step (l) of storing said one of the matrices selected in step (k).

* * * * *